United States Patent
Bitner et al.

(12)

(10) Patent No.: US 6,214,077 B1
(45) Date of Patent: Apr. 10, 2001

(54) SPRING LOADED DOOR ASSEMBLY

(75) Inventors: Glenn W. Bitner, Alsip; Michael T. Gerardi, Orland Park; Andrew J. Wichlinski, Jr., Crete, all of IL (US)

(73) Assignee: Venturedyne, Ltd., Milwaukee, WI (US)

( * ) Notice: Subject to any disclaimer, the term of this patent is extended or adjusted under 35 U.S.C. 154(b) by 0 days.

(21) Appl. No.: 09/309,106

(22) Filed: May 10, 1999

(51) Int. Cl.$^7$ .................................................. B01D 46/04
(52) U.S. Cl. ........................ 55/490; 55/493; 55/498; 55/508
(58) Field of Search ...................... 55/302, 490, 493, 55/498, 505, 507, 508, 510, 484; 96/149

(56) References Cited

U.S. PATENT DOCUMENTS

| | | | |
|---|---|---|---|
| 4,209,310 | * | 6/1980 | Berkhoel ................................ 55/505 |
| 4,735,638 | * | 4/1988 | Ciliberti et al. ....................... 55/507 |
| 4,822,386 | * | 4/1989 | Duchesneau ........................... 55/507 |
| 5,062,872 | * | 11/1991 | Williams ................................ 55/508 |
| 5,409,512 | * | 4/1995 | Wilkerson et al. ..................... 55/302 |
| 5,599,364 | * | 2/1997 | Hawkins ................................ 55/508 |
| 5,746,796 | * | 5/1998 | Ambs et al. ............................ 55/493 |
| 5,803,954 | * | 9/1998 | Gunter et al. .......................... 55/302 |
| 5,895,510 | * | 4/1999 | Butler et al. ........................... 55/490 |

FOREIGN PATENT DOCUMENTS

2181967 * 5/1987 (GB) .

* cited by examiner

*Primary Examiner*—David A. Simmons
*Assistant Examiner*—Minh-Chau T. Pham
(74) *Attorney, Agent, or Firm*—Jansson, Shupe & Munger, Ltd.

(57) ABSTRACT

A door assembly for securing an elongate filter cartridge in a dust collector. The door assembly utilizes a mounting plate engaged with the cover of an elongated filter cartridge so as to substantially seal the cartridge opening. The filter cartridge and mounting plate surround a support rod which extends through an aperture in an outer door that is engaged with the door wall of the dust collector so as to substantially seal the entrance of the dust collector. A spring assembly is positioned about the rod connects the door to the mounting plate. A compression spring within the spring assembly extends between the door and mounting plate, and a holder is tightenably and removably engaged with the end of the support rod thereby applying a closing force along the rod and sealing the cartridge in position in the dirty-air chamber.

11 Claims, 4 Drawing Sheets

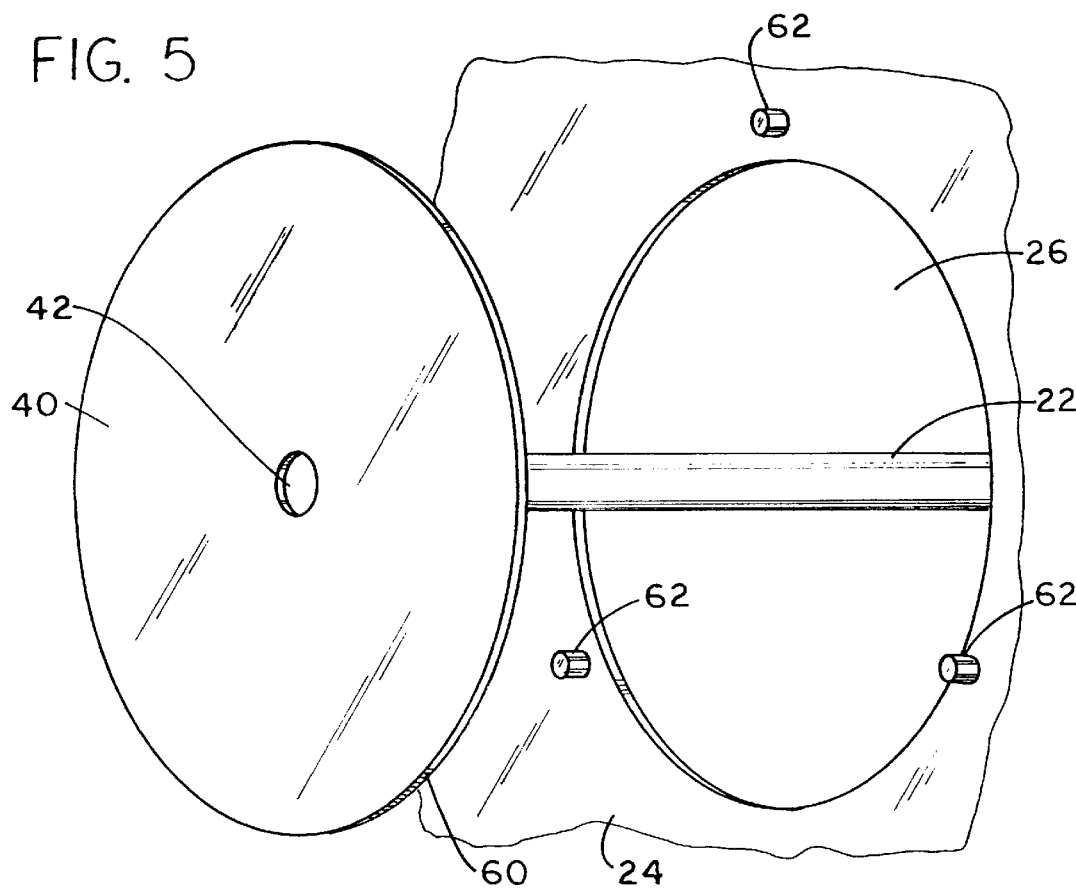
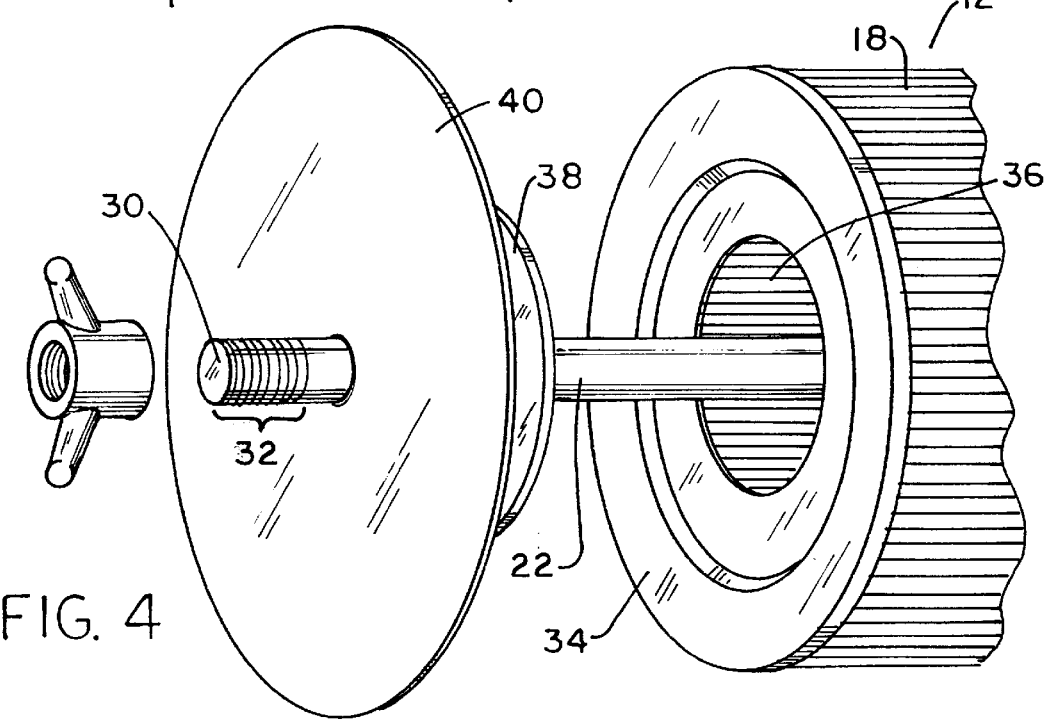

SPRING LOADED DOOR ASSEMBLY

FIELD OF THE INVENTION

This invention involves a door assembly in general, and in particular, a door assembly utilized with an industrial dust collector.

BACKGROUND OF THE INVENTION

In air filter assemblies commonly referred to as dust collector systems, filter cartridges are used to remove impurities from air that is drawn into a dirty-air chamber. Such air is drawn from various sources including fume and ventilation hoods used in various industrial applications such as welding and chemical and pharmaceutical processing.

Over a period of time, the filters used in the dust collector systems must be changed as they become clogged with dust. Given the need to maintain a substantially sealed interface between various air zones within the dirty-air chamber as well as the need to support the filters once they are placed in the chamber, a door assembly that would be easy to remove to allow for ease of access to the cartridge as well as transfer enough force along the axis of the filter to provide for constant sealing of the cartridges in place would be an important improvement in the art.

OBJECTS OF THE INVENTION

An object of the invention is to provide a new device for securing an elongated filter cartridge in a dirty-air chamber that overcomes some of the problems and shortcomings of the prior art.

Another object of the invention is to provide a new device for securing an elongated filter cartridge in a dirty-air chamber that allows for ease of handling by an operator.

Still another object of the invention is to provide a new device for securing an elongated filter cartridge in a dirty-air chamber which applies constant pressure against the seal and is removable in one piece thereby allowing easy access to the filter cartridge.

Yet another object of the invention is to provide a new device for securing an elongated filter cartridge in a dirty-air chamber that allows for the use of the same style of filter cartridge on both the front and back filters in a multi-cartridge arrangement. How these and other objects are accomplished will become apparent from the following descriptions and from the drawings.

SUMMARY OF THE INVENTION

The invention involves a device for securing an elongate filter cartridge in a dirty-air chamber. The dirty-air chamber is enclosed on all sides and has a door wall that includes a passageway or access opening. A rod extends from the passageway through the cartridge to the opposing end wall of the chamber where it is secured with respect to the end wall. The first end of the rod which extends through the passageway includes a securement feature. A cartridge having an end cover that forms an opening is inserted in the chamber around the rod. A mounting plate is engaged with the cover so as to substantially seal the cartridge opening. An outer door having an aperture through which the first end of the rod extends is engaged with the door wall so as to substantially seal the passageway. A spring assembly which is positioned about the rod connects the door to the mounting plate. The spring assembly includes a plurality of guide pins spaced around the rod. These guide pins have both a proximal and a distal end. Such pins are affixed at their proximal ends to either the door or the mounting plate. The distal end of the guide pins slideably extend through and are in substantially sealed engagement with the other of the door or mounting plate. Such distal ends are retained so as to prevent them from backing out of the sealed engagement. A compression spring extends between the door and mounting plate, and a holder is tightenably and removably engaged with the securement feature of the rod thereby applying a closing force along the rod and sealing the cartridge in position in the dirty-air chamber.

In one embodiment of the invention, a second filter cartridge of the same style as the first filter cartridge is aligned in registry with the first filter cartridge and adjacent to the second end cover of such first filter. In this embodiment, the rod extends through the second filter cartridge such that the second end of the rod is secured with respect to the end wall of the dirty-air chamber.

In a preferred embodiment of the invention, the door is circumscribed by an outer edge. At least one support is located on the outer door wall outside of the air chamber. This support is in contact with the outer edge of the door so as to help support the door. In one particular version of this embodiment, the support is mounted at the bottom of the door. In yet a more preferred version of such embodiment, the support is comprised of a plurality of guide pins that are equally spaced around the outer edge of the door. Such guide pins contact the outer edge where they not only support the door, but also act as a guide to assist the operator in positioning the door on the dirty-air chamber.

In still another preferred embodiment of the invention, the mounting plate, spring assembly, and outer door are joined together so as to form a single unit. This embodiment allows all of the components of the door assembly to be removed as one when the door is removed thereby greatly facilitating the changing of the filter cartridges.

In yet another embodiment of the invention, the compression spring is positioned in the spring assembly so that one end is adjacent to an internal spacer that is in sealable engagement with the door while the other end is adjacent to a compression spring guide plate that is in sealable engagement with the mounting plate. In a particular version of such embodiment, a guide pin seal is located between the compression spring guide plate and the mounting plate and one of the ends of the guide pins extends through the compression spring guide plate, the guide pin seal, and the mounting plate.

In one embodiment of the invention, the filter cartridge has a first cross-dimension, the mounting plate has a second cross-dimension, and the door has a third cross-dimension. In such embodiment, the third cross-dimension is greater than the first cross-dimension which is greater than the second cross-dimension.

In still another embodiment, one of the ends of each of the guide pins has a hole through it that is in close proximity to the end. In such embodiment, a wire retainer is threaded through the hole in each guide pin in such a manner that it acts as a retainer thereby preventing the guide pins from backing out of their connection.

In the preferred embodiment of the invention, the filter cartridge is cylindrical although nothing in the invention precludes the cartridge from being in any one of a number of geometric shapes. Also in the preferred embodiment, the first end of the rod is threaded thus allowing the holder to be screwed onto the rod in order to secure the door.

BRIEF DESCRIPTIONS OF THE DRAWINGS

FIG. 4 is a perspective view minus the chamber wall showing a filter cartridge in registry with the door assembly surrounding a support rod.

FIG. 5 is a perspective view showing a cut-away view of the outer door wall, the door, the support rod, and door support pins.

DETAILED DESCRIPTION OF PREFERRED EMBODIMENTS

Figure 1:
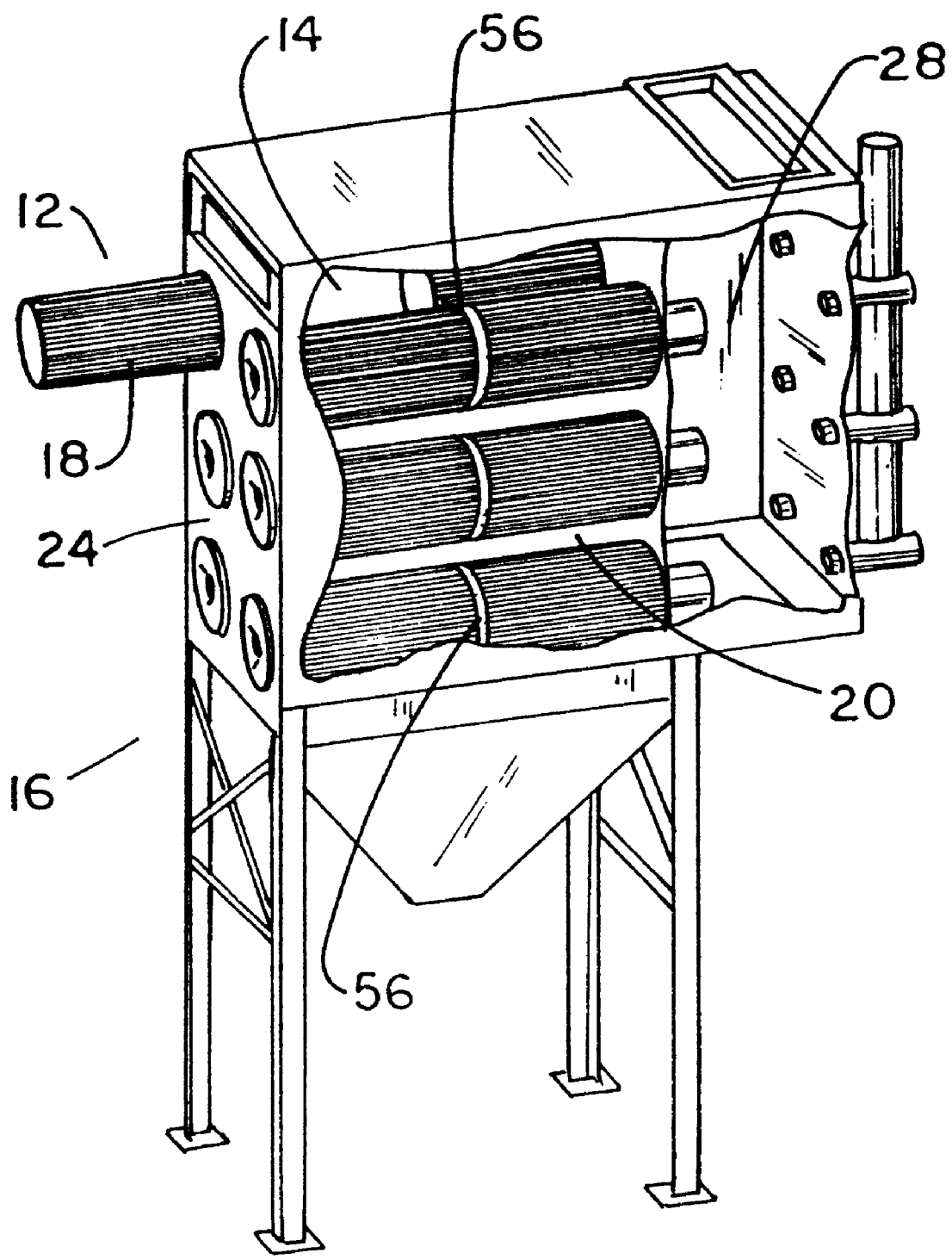
FIG. 1 is a cut-away perspective of a side-load dust collector showing both the dirty-air and clean-air chambers.

The invention involves a device 10 for securing an elongate filter cartridge 12 in the dirty-air chamber 14 of a dust collector 16 or dust collector system. Such dust collectors 16 are used to filter impurities contained in air streams coming from any of a number of sources such as exhaust hoods or fume collection hoods utilized at a welding station, chemical lab or the like.

One of the main purposes for using the invention is to provide ease of access to the filter cartridges 12 located in the dust collector 16. This invention allows an operator to easily install new cartridges 12 and remove old ones from the dirty-air chamber 14 of a side load cartridge collector 16.

Figure 2:
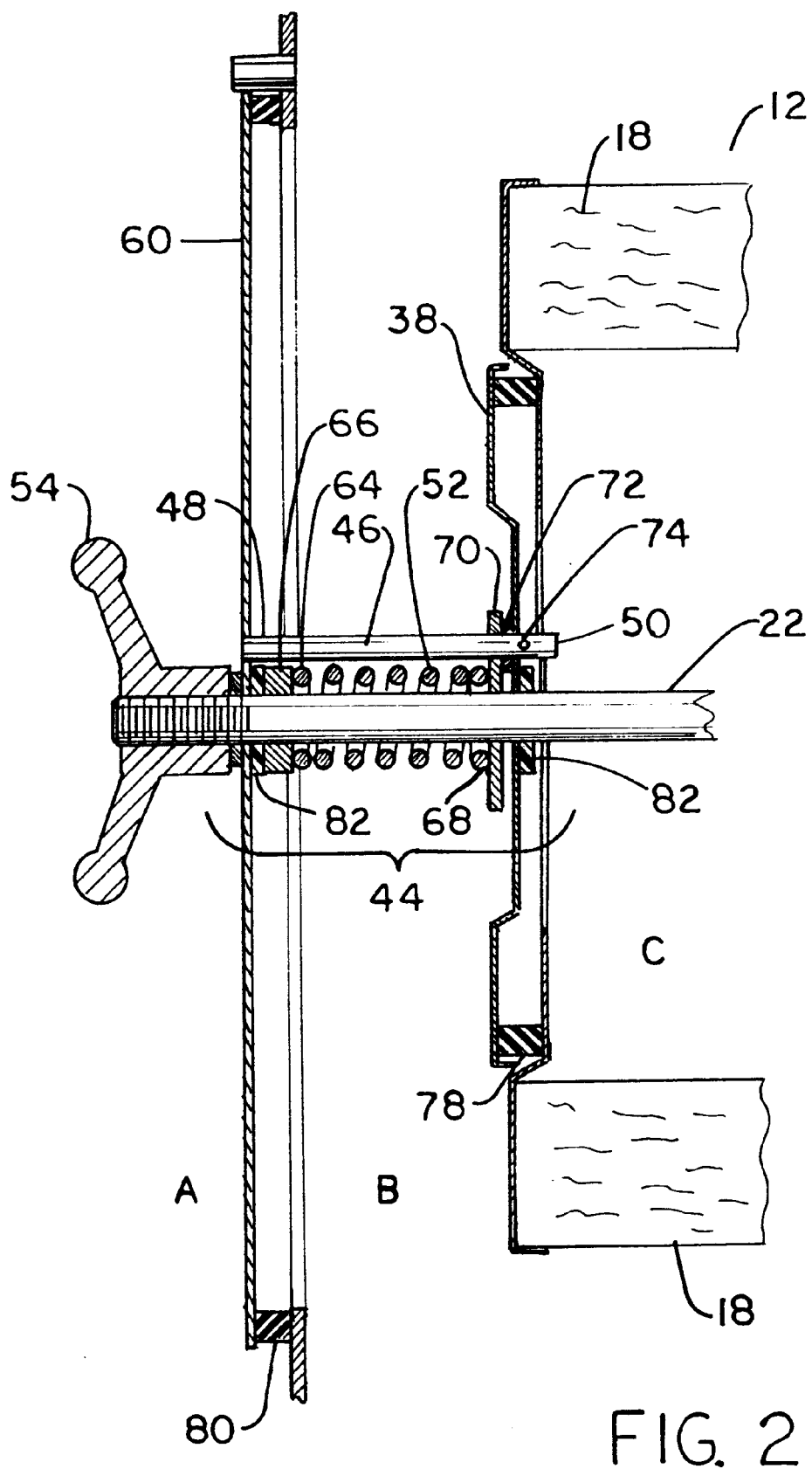
FIG. 2 is a sectional view of the door assembly showing the assembly connected to the filter cartridge.

Typically on a side load cartridge collector 16, there are rows of cylinder-shaped cartridges 12 that contain filter media 18. Usually, two cylinder-shaped cartridges 12, 20 make one row and lie horizontally inside the dirty-air chamber 14 of the collector 16. Such cartridges 12, 20 are inserted end to end over a center support 22 that runs through the longitudinal axis of the cartridges 12, 20. With the cartridges 12, 20 in the collector 16, three independent air zones A, B, C, are established. These air zones, A, B, C, which are shown in FIG. 2 must be maintained during the operation of a side load collector 16 are as follows:

Zone A. The air pressure outside the collector typically defined as 1 atmosphere (14.7 psia);

Zone B. The dusty air inside the dirty air chamber but not inside the filtered cartridges;

Zone C. The filtered air inside the cartridges and intermittent cleaning air pressure generated from the momentary release of compressed air.

It is important that these zones A, B, C, be effectively sealed off from one another so that the air in one zone does not leak into another zone during the operation of the dust collector 16.

As shown in FIGS. 1 and 2, the invention involves a dirty-air chamber 14 that is enclosed on all sides and includes a door wall 24 that has a passageway 26 or access opening. A rod 22 extends from the passageway 26 through the cartridge 12 to the opposing end wall 28 of the chamber 14 where it is secured with respect to the end wall 28. The rod 22 provides a rigid support for the filter cartridges 12, 20 and the door assembly 10 as the first end 30 of the rod 22 extends through the passageway 26 and includes a securement feature 32. While a variety of securement features 32 could be used, the preferred embodiment, as shown in FIG. 4 involves a threaded portion on the end of the rod 22.

As shown in FIG. 4, a filter cartridge 12 having an end cover 34 that forms an opening 36 is inserted in the chamber 14 around the rod 22. A mounting plate 38 is engaged with the cover so as to substantially seal the opening 36. Such sealing can be accomplished through the use of a mounting plate O-ring 78 or any other suitable sealing apparatus. An outer door 40 having an aperture 42 through which the first end 30 of the rod 22 extends is engaged with the door wall 24 so as to substantially seal the passageway 26. As with the mounting plate 38, the sealing of the passageway 26 can be accomplished by the use of a door wall O-ring 80 or any other suitable sealing apparatus.

Figure 3:
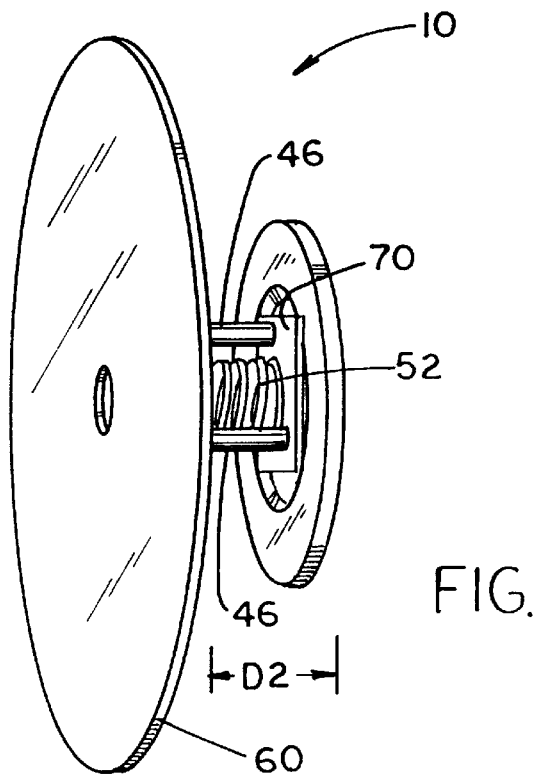
FIG. 3 is a perspective view of a single-unit door assembly viewed from the door side of the assembly showing the spring assembly connecting the outer door to the mounting plate.
Figure 6:
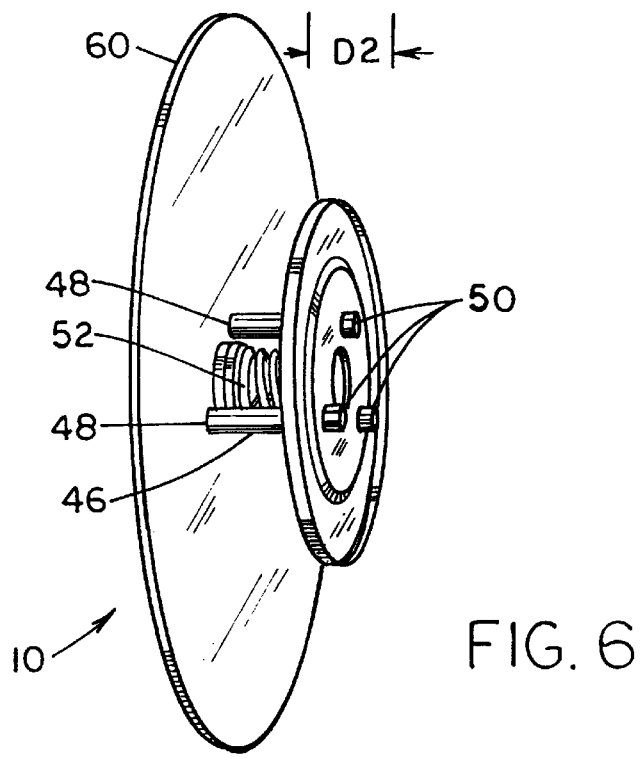
FIG. 6 is a perspective view of a single-unit door assembly viewed from the mounting plate side of the assembly showing the spring assembly connecting the outer door to the mounting plate.

A spring assembly 44 such as the one shown in FIGS. 2 and 3 is positioned about the rod 22 thereby connecting the door 40 to the mounting plate 38. The spring assembly 44 includes a plurality of guide pins 46 spaced around the rod 22. These guide pins 46 have both a proximal 48 and a distal 50 end. Such pins 46 are affixed at their proximal ends 48 to either the door 40 or the mounting plate 38. The distal end 50 of the guide pins 46 slidably extend through and are in substantially sealed engagement with the other of the door 40 or mounting plate 38. Such distal ends 50 are retained so as to prevent them from backing out of the sealed engagement. A compression spring 52 extends between the door 40 and mounting plate 38, and a holder 54 is tightenably and removably engaged with the securement feature 32 of the rod 22 thereby applying a closing force along the rod 22 and sealing the cartridge 12 in position in the dirty-air chamber 14.

In one embodiment of the invention, a second filter cartridge 20 is aligned in registry with the first filter cartridge 12 and adjacent to the second end cover 56 of such first filter 12. In this embodiment, the rod 22 extends through the second filter cartridge 20 and is secured with respect to the end wall 38 of the dirty-air chamber 14. This arrangement allows for the use of identical cartridges 12, 20 thereby permitting the operator to purchase and stock only one style of cartridge.

In a preferred embodiment of the invention, the door 40 is circumscribed by an outer edge 60. As shown in FIG. 5, at least one support 62 is located on the outer door wall 24 outside of the air chamber 14. This support 62 is in contact with the outer edge 60 of the door 40 so as to help support the door 40. In one particular version of this embodiment, the support 62 is mounted at the bottom of the door 40. FIG. 5 also shows the more preferred version of such embodiment where the support 62 is comprised of a plurality of pins 62 that are equally spaced around the outer edge 60 of the door 40. Such pins 62 contact the outer edge 60 where they not only support the door 40, but also act as a guide to assist the operator in positioning the door 40 on the dirty-air chamber 14.

In the most preferred embodiment of the invention, as shown in FIG. 3, the mounting plate 38, spring assembly 44, and outer door 40 are joined together so as to form a single unit 10. This embodiment allows all of the components of the door assembly 10 to be removed as one when the door 40 is removed thereby greatly facilitating the changing of the filter cartridges 12, 20. In such embodiment, once the door 40 is removed, the cartridge 12 can be pulled through the passageway 26 in the door wall 24 of the dirty-air chamber 14. Should a second cartridge 20 be used, that cartridge 20 too can be pulled along the rod 22 and through the passageway 26 in the door wall 24. This arrangement allows for easy removal of the cartridge 20 without requiring an operator to climb into the dirty-air chamber 14. Furthermore, the single unit assembly provides a rigid support for the cartridge 12 during the operation of the dust collector 16. This in turn allows for the use of a lighter weight rod 22.

Another benefit of the single unit assembly of the door 40, spring assembly 44 and mounting plate 38 is that it allows all of the independent surfaces located between the various air zones to be sealed using only the single unit assembly and one adjustment holder 54. This is because as one tightens the holder 54, the entire door assembly 10 is shortened as the spring 52 compresses. As this happens, the door 40 seals against the door wall 24 thereby starting the sealing process throughout the dirty-air chamber 14. Prior to the door 40 sealing against the door wall 24, the mounting plate 38 begins to seal against the cartridge end cover 34. The amount of sealing pressure finally received will be determined by the final position of the holder 54. Although various forms of holders 54 could be used, the preferred embodiment, as shown in FIG. 2, utilizes a knob type version thus allowing for ease of tightening.

In yet another embodiment of the invention, as shown in FIG. 2, the compression spring 52 is positioned in the spring assembly 44 so that one end 64 is adjacent to an internal spacer 66 that is in sealable engagement with the door 40 while the other end 68 is adjacent to a compression spring guide plate 70 that is in sealable engagement with the mounting plate 38. This internal spacer 66 allows for a predetermined amount of compression spring force to be applied to the cartridge 12 and its contact point at the end wall 34. In a particular version of such embodiment, a guide pin seal 72 is located between the compression spring guide plate 70 and the mounting plate 38 and one of the ends 50 of the guide pins 46 extends through the compression spring guide plate 70, the guide pin seal 72, and the mounting plate 38. In a more specific version of such embodiment, spring assembly O-rings 82 are located between the internal spacer 66 and the door 40 and the mounting plate 38 and the filter cartridge 12.

In one embodiment of the invention, the filter cartridge 12 has a first cross-dimension D1, the mounting plate 38 has a second cross-dimension D2, and the door 40 has a third cross-dimension D3. In such embodiment, the third cross-dimension D3 is greater than the first cross-dimension D1 which is greater than the second cross-dimension D2.

In still another embodiment, one of the ends 50 of each of the guide pins 46 has a hole 74 through it that is in close proximity to the end 50. In such embodiment, as shown in FIG. 3, a wire retainer 76 is threaded through the hole 74 in each guide pin 46 in such a manner that it acts as a retainer thereby preventing the guide pins 46 from backing out of their connection.

In the preferred embodiment of the invention, the filter cartridge 12 is cylindrical although nothing in the invention precludes the cartridge 12 from being in any one of a number of geometric shapes. Also in the preferred embodiment, the first end 30 of the rod 22 is threaded thus allowing the holder 54 to be screwed onto the rod 22 in order to secure the door 40.

The overall device is designed to be light weight so as to allow for the insertion and removal of the entire assembly 10 from outside the dust collector 16 without the need for any special tools.

While the principles of the invention have been shown and described in connection with but a few embodiments, it is understood clearly that such embodiments are by way of example and are not limiting.

What is claimed:

1. A device for securing an elongate filter cartridge in a dirty-air chamber having a door wall defining a passageway and an opposed end wall, comprising:

a rod extending from a first end at the passageway through the cartridge to a second end secured with respect to the end wall, the first end having a securement feature;

the cartridge having an end cover forming an opening;

a mounting plate engaged with the cover to substantially seal the opening;

an outer door engaged with the door wall to substantially seal the passageway, the door having an aperture through which the first end of the rod extends;

a spring assembly, about the rod, connecting the door to the mounting plate, the spring assembly including:
  a plurality of guide pins spaced around the rod and having proximal and distal ends, the pins being affixed at their proximal ends to one of the door and mounting plate, and slidably extending through and in substantially sealed engagement at their distal ends with the other of, the door and mounting plate,
  a retainer at the distal ends, and
  a compression spring between the door and mounting plate; and a holder tightenably and removably engaged with the securement feature of the rod thereby applying a closing force along the rod and sealing the cartridge in position.

2. The device of claim 1 wherein:

the filter cartridge has a second end cover opposed to the first end cover;

the second end cover defines a second opening;

a second filter cartridge is aligned in registry the filter cartridge; and the rod extends from the first end at the passageway through the filter cartridge and the second filter cartridge to the second end secured with respect to the end wall.

3. The device of claim 1 wherein:

an outer edge circumscribes the door;

at least one support is located outside of the air chamber on the outer door wall; and the support is in contact with the outer edge of the door.

4. The device of claim 3 wherein:

the support is a pin;

a plurality of pins are equally spaced around the outer edge of the door; and the pins are in contact with the outer edge of the door.

5. The device of claim 1 wherein:

the mounting plate;

the spring assembly; and the outer door are connected so as to form a single unit.

6. The device of claim 1 wherein:

the compression spring has a first end and a second end;

an internal spacer in sealable engagement with the door is adjacent to the first end of the spring; and a compression spring guide plate is adjacent to the second end of the spring and in sealable engagement with the mounting plate.

7. The device of claim 6 wherein:

a guide pin seal is located between the compression spring guide plate and the mounting plate; and one of the ends of the guide pins extends through the compression spring guide plate, the guide pin seal, and the mounting plate.

8. The device of claim 1 wherein:

the filter cartridge has a first cross-dimension;

the mounting plate has a second cross-dimension;

the door has a third cross-dimension; and the third cross-dimension is greater than the first cross-dimension which is greater than the second cross-dimension.

9. The device of claim 1 wherein:

one of the ends of each of the plurality of guide pins has a hole in close proximity to such end; and a wire retainer is threaded through the hole in each of the plurality of guide pins.

10. The device of claim 1 wherein the filter cartridge is cylindrical.

11. The device of claim 1 wherein the first end of the rod is threaded.

* * * * *